United States Patent
Ruffino

(10) Patent No.: US 7,269,869 B1
(45) Date of Patent: Sep. 18, 2007

(54) GOLF TOOL

(76) Inventor: Stephen Ruffino, 291 Hope St., Unit B-1, Stamford, CT (US) 06906

( * ) Notice: Subject to any disclaimer, the term of this patent is extended or adjusted under 35 U.S.C. 154(b) by 0 days.

(21) Appl. No.: 11/338,178

(22) Filed: Jan. 24, 2006

Related U.S. Application Data

(60) Provisional application No. 60/648,066, filed on Jan. 28, 2005.

(51) Int. Cl.
- *B25F 1/00* (2006.01)
- *A46B 15/00* (2006.01)
- *A46B 9/02* (2006.01)

(52) U.S. Cl. .................. 7/164; 7/901; 15/105; 15/160; 21/795

(58) Field of Classification Search .............. 7/164, 7/901, 169, 170, 163; 15/105, 106, 159.1, 15/160, 184; 33/755, 759–761, 768–770; 403/DIG. 1; D21/789, 793, 795
See application file for complete search history.

(56) References Cited

U.S. PATENT DOCUMENTS

| | | | | |
|---|---|---|---|---|
| 4,912,800 A | * | 4/1990 | Zeltner | 15/114 |
| 5,213,240 A | * | 5/1993 | Dietz et al. | 224/183 |
| 5,555,589 A | * | 9/1996 | Moultrie | 15/105 |
| 5,815,873 A | * | 10/1998 | Jones | 15/106 |
| 6,502,727 B1 | * | 1/2003 | Decoteau | 224/162 |

\* cited by examiner

*Primary Examiner*—Joseph J. Hail, III
*Assistant Examiner*—Bryan R. Muller
(74) *Attorney, Agent, or Firm*—Schweitzer Cornman Gross & Bondell LLP

(57) ABSTRACT

A combination golf tool comprises a clubhead brush including a bristle portion mounted in or on a housing portion; an extendable, retractable measuring tape being disposed in the housing portion for selective deployment.

5 Claims, 3 Drawing Sheets

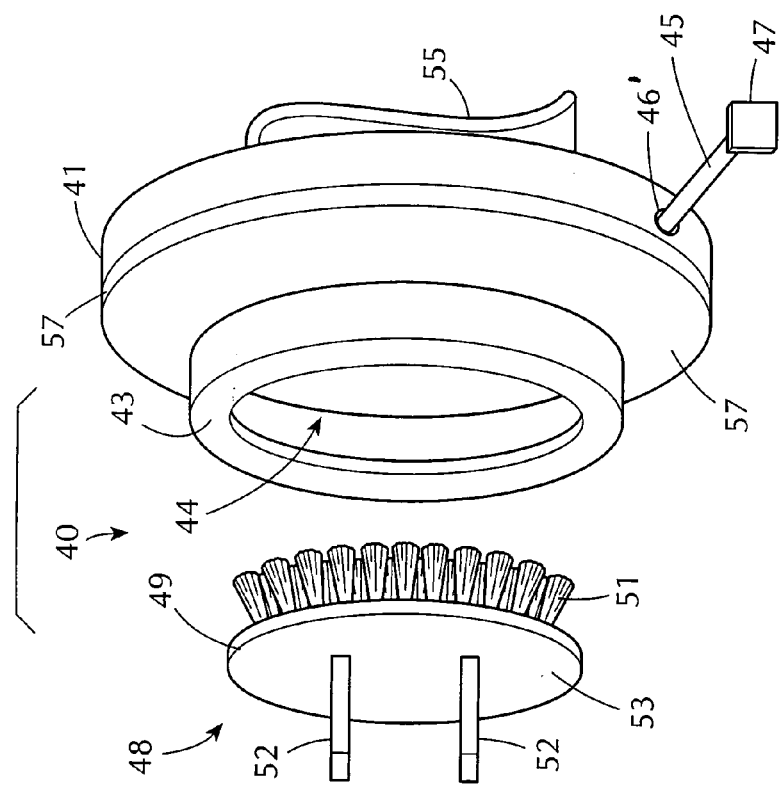
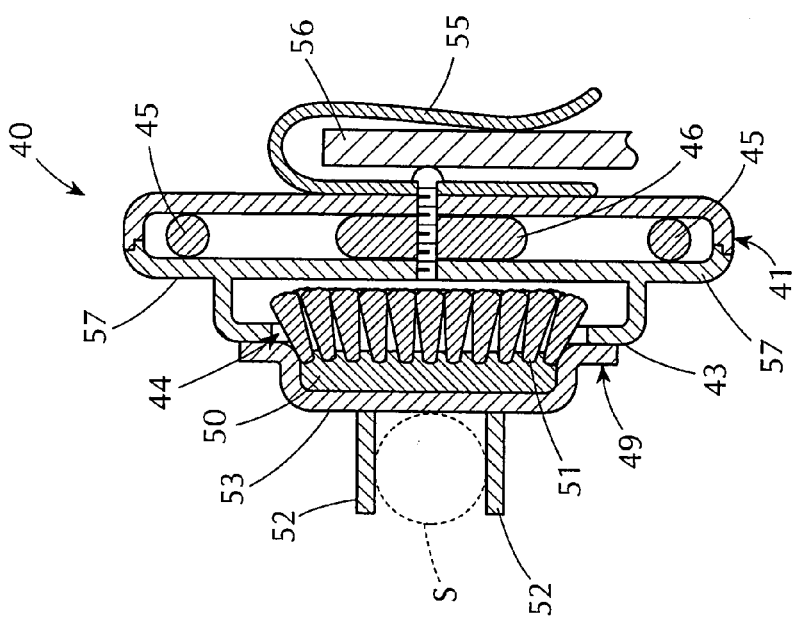
FIG. 6
FIG. 5

GOLF TOOL

The priority of provisional Application No. 60/648,066, filed on Jan. 28, 2005, is claimed.

BACKGROUND OF THE INVENTION

The game of golf has enjoyed widespread popularity over the past 120 years, resulting in many innovations and improvements in the equipment used to play the game, namely golf clubs, golf balls, and accessories used by golfers. It is a new and improved accessory tool for golfers to which the present invention is directed.

Among existing accessory tools employed by golfers are tee holders, ball holders, club holders, ball markers, ball cleaners, club cleaners, divot repair tools, spike cleaning tools, and cigar holders. Various combinations and permutations of these devices have been long available to the golfing world.

SUMMARY OF THE PRESENT INVENTION

Among the challenges often facing golfers is the determination on the putting green as to who is "away," i.e. which golfer's ball is farthest from the hole. While more often than not this determination may be made by simple observation or by pacing off the questioned distance, this is not always sufficient when two or more balls appear to be generally equidistant to the hole. This problem may be resolved by resort to use of a tape measure, a tool not traditionally carried by or otherwise available to golfers. It is noted that tape measures may on occasion be present on or near putting greens when a "closest to the pin" contest is being conducted.

It is a simple and efficient solution to this problem that the present invention is directed. Moreover, the solution employs the usage of a common tool often carried by golfers in their golf club bag, namely a club cleaning brush.

The present invention is a new combination clubhead brush and measuring tape, formed by making the brush handle itself or the brush holder a repository for a retractable measuring tape. The entire new unit is compact; easy to handle and to use; and is readily mountable on the golfer's belt or clothing by appropriate mounting mechanisms.

For a more complete understanding of the present invention and for a greater appreciation of its attendant advantages, reference should be made to the accompanying drawings and following detailed description of the invention.

DESCRIPTION OF THE DRAWINGS

FIG. 5 is a cross-sectional view of an alternate preferred embodiment of the invention; and FIG. 6 is an exploded perspective view of the alternate preferred embodiment of the invention.

DETAILED DESCRIPTION OF THE INVENTION

Figure 2:
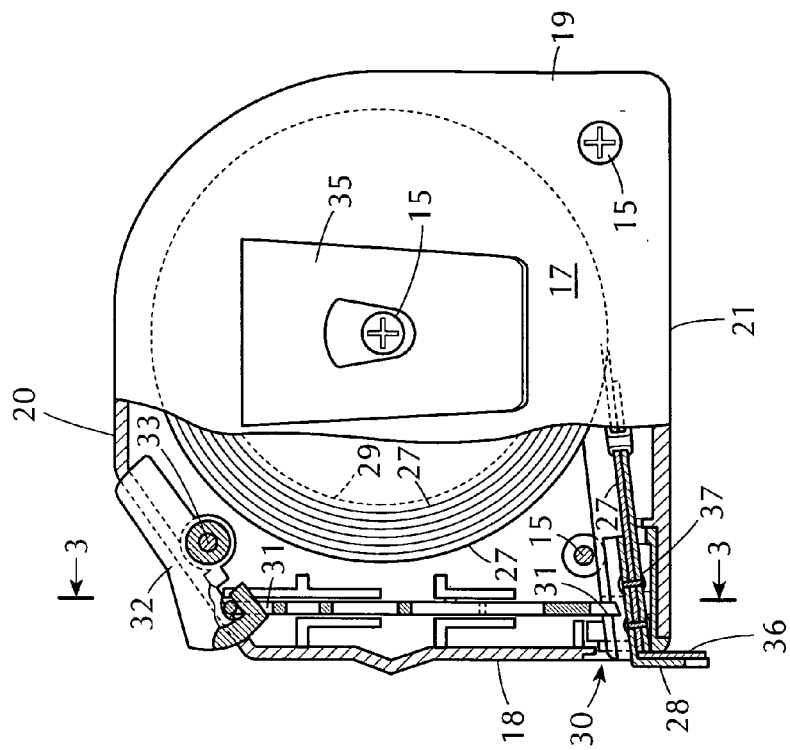
FIG. 2 is a rear elevational view of the new tool of FIG. 1 with parts broken away to show details of construction.
Figure 1:
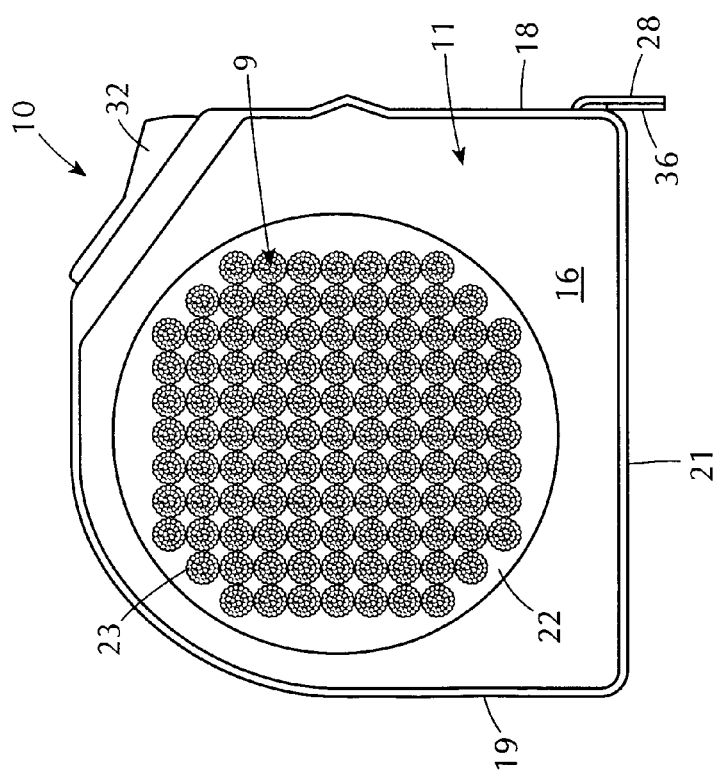
FIG. 1 is a front elevational view of a first embodiment of the new brush/measuring tape golf tool of the invention.
Figure 3:
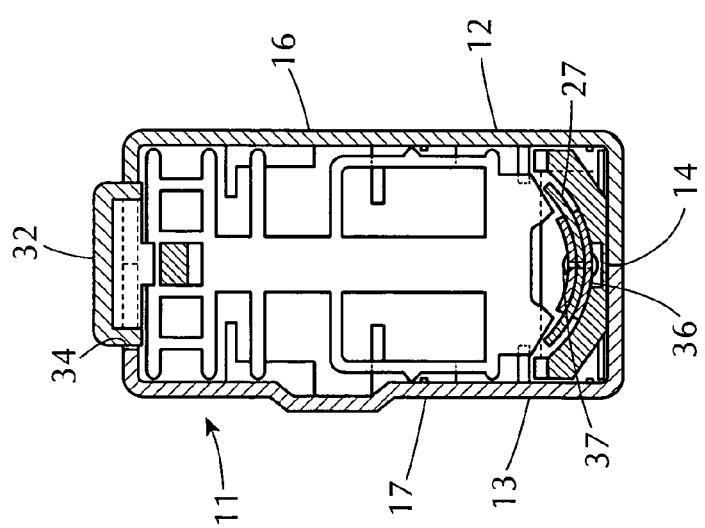
FIG. 3 is a cross-sectional view taken along line 3-3 of FIG. 2.

Referring initially to FIG. 1, a first embodiment of the new golf tool 10 generally comprises a compact brush handle 11 and a circular brush element 9. The handle 11 is hollow and formed from opposed shell members 12, 13 (FIG. 3), which abut at the centerline 14 of the handle. The shell members are connected by screws 15 (FIG. 2).

More specifically, the handle 11 includes a front wall 16; a rear wall 17; sidewalls 18, 19; a curved top wall 20 extending between the side walls; and a bottom wall 21, also extending between the side walls.

These handle walls 16-21 circumscribe the brush element 9 and are of sufficient width to be readily grasped for manipulating the brush tool 10 against the surface of a clubhead to be cleaned.

Figure 4:
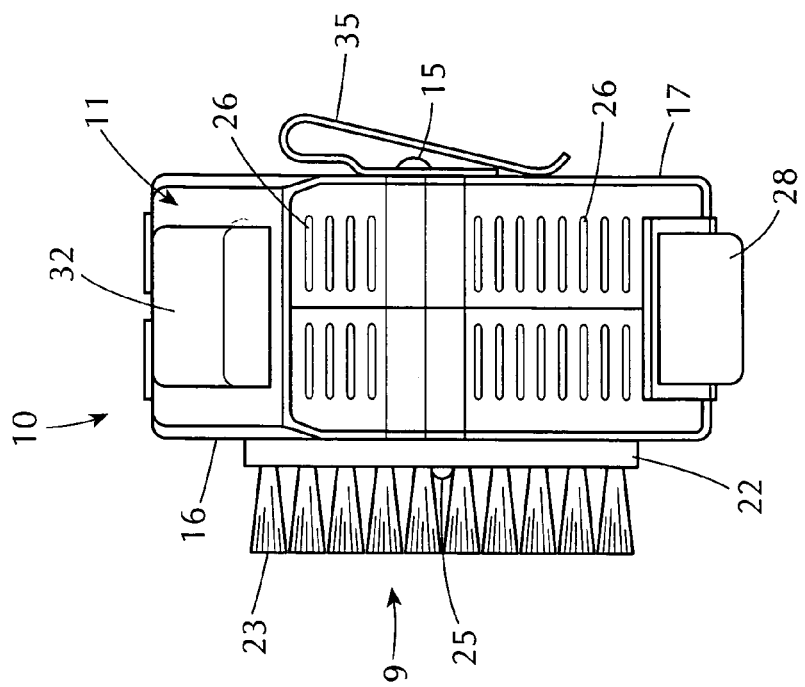
FIG. 4 is a top plan view of the first embodiment of the new golf tool of the invention.

The brush element 9 itself is comprised of a mounting plate 22, advantageously a thermoplastic sheet into which a series of outwardly projecting bristles 23, which may be plastic such as nylon or metallic, are permanently attached by heat welding, force fitting into predrilled holes or otherwise. The bristles 23 may be arrayed in discrete clusters as shown in FIG. 4 or otherwise arranged in predetermined patterns for engaging grooves in clubhead faces. Plastic mesh may be used in lieu of bristles. The plate 22 is secured to the front wall 16 by a rivet 25 or alternatively the plate may be fastened to the wall 16 by a layer of epoxy adhesive.

If desired, the grippability of the handle walls 16-21 may be enhanced by forming gripping protrusions or ribs 26 on the exterior surface or otherwise providing a separate friction layer.

As shown in FIG. 2, the handle 11 for the brush element 9 includes an extendable/retractable measuring tape 27. In accordance with the invention, the forwardmost end of the tape has a specially configured L-shaped end-piece or stop 28 which may be grasped to extend the tape in known fashion.

The tape 27 is biased by a coil spring 29 (shown schematically) attached to the inner end of the tape. The end wall 18 has a slot 30 through which the tape 27 is deployed for extension and retraction in known manner.

A locking bar 31, deployed in opening 34, is actuated by a pivoting lock lever 32 supported on a pivot bar 33 to selectively lock the tape in extended positions.

This type of retractable tape measure mechanism is well known where the coiled tapes are formed from plastic or metal strips and are housed in plastic or metal casings and biased by coil springs. Examples, including tape measures with locking features, are shown in U.S. Pat. Nos. 4,474,340; 4,194,703; and 5,210,956, the disclosures of which are incorporated by reference herein.

The entire new golf tool 10 may be readily mounted on the belt or clothing of the golfer by a spring clip 35 attached to the rear wall 17 by one of the screws 15. Other fastening or holding devices such as magnetic clip-on mechanisms or mini-holsters also may be used to secure the tool to the person of the golfer. The important features of the new tool are the compactness and ready availability of the brush/tape tool for usage when needed and quick stowage when the required task is completed.

As a specific feature of the new tool, the end-piece 28 has an elastomeric liner 36 adhered thereto for engaging the earthen lip of the putting green cup in a safe manner. Moreover, the end-piece may be configured to be congruent with the cup, i.e. to have a curvature having a radius of 2.125 inches.

The end-piece 28 and liner 36 may be sandwiched about the end of the tape 27 by rivets 37 or other suitable fasteners.

As will be understood, the new tool 10 may be carried by a golfer by securing it through the clip 35 to the golfer's clothing. When needed, the tool may be removed for cleaning a clubhead and/or measuring the distance of a ball to the hole on a putting green by engaging the contoured end-piece 28 through the elastomeric element 36 to the cup and extending the tape 27 to the ball. The tool may be quickly stowed after usage.

An alternate preferred embodiment of the golf tool of the invention is shown in FIGS. 5 and 6 in which an independent brush 48 is supported in a separate housing 41. This embodiment of the new tool 40 generally comprises an annular housing 41 having a metallic (ferrous) mounting ring 43 secured to wall 57 of the housing by adhesive or welds (not shown). The ring 43 defines a brush-receiving aperture 44. A coiled measuring line 45, of plastic monofilament or the like, is rolled or wound over a spring biasing mechanism 46 and is secured within the housing 41 for selective withdrawal therefrom through circular opening 46' by grasping an end piece 47 (which may be identical to end piece 28 if desired). The monofilament is a measuring tape that operates in the manner of the tape 27 described hereinabove. It may be deployed and retracted to measure distances of balls on the putting green from the hole.

The golf club brush 48 includes a magnetized, stepped, circular plate 49. A bristle-holding plate 50 into which a plurality of bristles 51 (of the same type as any of the bristles 23 described hereinabove) is attached to the magnetic plate 49.

In accordance with the invention, the brush is magnetically held in the aperture 44, as will be understood. Parallel grasping tabs 52 are attached to the outer surface 53 of the stepped magnetic plate 49. The tabs are grasped for inserting the brush 48 into or removing it from the opening 44 in the housing 41. Thus, when a golfer wishes to utilize the brush 48 the tabs are used to remove the brush and to overcome the magnetic locking attraction between the plate 49 and ring 43. It will be further understood that while both the plate 49 and the ring 43 are ferrous, only one of the two elements need be magnetized.

As an additional feature of this preferred embodiment of the invention, the tabs 52 will function either as a cigar holder or to hold the shaft (3 in phantom in FIG. 5) of a golf club above the grass (keeping the grip dry) when the brush 48 is set down on the bristles 51 to be freestanding on a grassy surface.

As with the first embodiment of the invention, the alternate preferred embodiment includes a spring clip 55 for securing the new golf tool to the belt 56 or clothing of the golfer or to a golf club bag itself. The brush 48 may be removed when needed by grasping the tabs 52 to separate the brush 48 from the housing 41. If the brush 48 is set upright on a surface, it may hold a cigar or support a golf club. Should a measurement of distance to the hole (cup) need to be made, the housing can be removed from its support and the measuring filament extended by grasping end piece 47, which will engage the lip of the hole, and extending the filament 45 to the ball. The filament may be indexed in any units as is standard for measuring devices.

Although the foregoing description of the new golf tool has been presented by way of two preferred embodiments, it will be understood by those skilled in the art that other forms of the invention falling within the ambit of the following claims are contemplated. Accordingly, reference should be made to the following claims in determining the full scope of the invention.

I claim:

1. A golf tool comprising
   (a) an annular housing including an extendable/retractable filament therein;
   (b) a brush-mounting ferrous ring secured to said housing;
   (c) a brush including a circular ferrous plate and a plurality of bristles secured thereto; one of said ferrous plate or said ferrous ring being magnetized;
   (d) said brush bristles being selectively mountable in said ring by cooperation of said circular plate and ferrous ring.

2. The golf tool of claim 1 in which
   (a) a mounting clip is attached to said housing for securing the housing to a support surface.

3. A golf tool in accordance with claim 1, further characterized in that:
   (a) said brush means is comprised of synthetic bristles.

4. A golf tool in accordance with claim 1 further characterized in that:
   (a) said brush means is comprised of metallic bristles.

5. The golf tool of claim 1 in which
   (a) a pair of graspable tabs project outwardly from said circular magnetic plate.

* * * * *